United States Patent
Lyonnaz

(10) Patent No.: US 7,274,672 B2
(45) Date of Patent: Sep. 25, 2007

(54) DATA PROCESSING SYSTEM AND METHOD

(75) Inventor: Gérard Lyonnaz, Varces (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 10/284,058

(22) Filed: Oct. 29, 2002

(65) Prior Publication Data

US 2003/0101222 A1    May 29, 2003

(30) Foreign Application Priority Data

Oct. 31, 2001  (EP) ................... 01410142

(51) Int. Cl.
*H04L 12/28*  (2006.01)
*H04B 7/212*  (2006.01)

(52) U.S. Cl. ...................... 370/257; 370/442
(58) Field of Classification Search ...................... None
See application file for complete search history.

(56) References Cited

U.S. PATENT DOCUMENTS

| | | | |
|---|---|---|---|
| 5,581,600 A | 12/1996 | Watts et al. ................... | 379/67 |
| 5,884,262 A | 3/1999 | Wise et al. .................. | 704/270 |
| 6,128,653 A | 10/2000 | del Val et al. .............. | 709/219 |
| 6,229,804 B1 | 5/2001 | Mortsolf et al. ............ | 370/352 |
| 6,247,175 B1 * | 6/2001 | Ledford et al. ............. | 717/157 |
| 6,298,324 B1 | 10/2001 | Zuberec et al. ............. | 704/251 |
| 6,324,580 B1 * | 11/2001 | Jindal et al. ................ | 709/228 |
| 6,396,907 B1 | 5/2002 | Didcock ................... | 379/88.17 |
| 6,400,806 B1 | 6/2002 | Uppaluru ................. | 379/88.02 |
| 6,493,870 B1 * | 12/2002 | Madany et al. ............. | 717/165 |
| 6,693,874 B1 | 2/2004 | Shaffer et al. .............. | 370/217 |
| 6,738,343 B1 | 5/2004 | Shaffer et al. .............. | 370/216 |
| 6,751,297 B2 | 6/2004 | Nelkenbaum ............ | 379/88.13 |
| 6,785,223 B1 | 8/2004 | Korpi et al. ................. | 370/218 |

(Continued)

FOREIGN PATENT DOCUMENTS

EP    1 026 918 A2    8/2000

(Continued)

OTHER PUBLICATIONS

Cohen, M.L. "DSP-Based Architecture for Real-Time T1 Bandwidth Management and Control." International Conference on Communications. vol. 2, Apr. 15, 1990 (pp. 690-697).

*Primary Examiner*—Andrew C. Lee

(57) ABSTRACT

The present invention relates to a data processing system and method and, more particularly, to a software TDM bus emulator which emulates the operation of a TDM bus. Often computer aided telephony voice processing applications that require specialised processing services such as DTMF tone detection, facsimile service and voice recognition or synthesis services. Typically, these services are provided via dedicated hardware digital signal processors that communicate using a SONET bus. However, not all computer aided telephony servers have the full range of such specialised hardware resources. Accordingly, the present invention provides a data processing method in which a TDM bus is emulated to periodically execute, using system resources, a number of software data processing resources, which communicate with each other to form a data processing chain. The results of the data processing chain are ultimately returned to the voice application. Suitably, a computer aided telephony server can be arranged to support a fuller range of services without having to install new or additional hardware processing resources such as digital signal processors and a physical TDM bus.

14 Claims, 3 Drawing Sheets

U.S. PATENT DOCUMENTS

| | | | |
|---|---|---|---|
| 6,854,109 B2 * | 2/2005 | Tapperson | 717/136 |
| 2002/0101860 A1 | 8/2002 | Thornton et al. | 370/352 |
| 2002/0107966 A1 | 8/2002 | Baudot et al. | 709/227 |
| 2003/0012178 A1 | 1/2003 | Mussman et al. | 370/352 |
| 2003/0088421 A1 | 5/2003 | Maes et al. | 704/270.1 |
| 2003/0101372 A1 | 5/2003 | Bouat et al. | 714/13 |
| 2003/0103494 A1 | 6/2003 | Lyonnaz | 370/352 |
| 2003/0133545 A1 | 7/2003 | Rosset | 379/93.01 |
| 2004/0076274 A1 | 4/2004 | Anselmetti et al. | 379/88.22 |
| 2004/0190442 A1 | 9/2004 | Lee | 370/217 |
| 2005/0058061 A1 | 3/2005 | Shaffer et al. | 370/216 |

FOREIGN PATENT DOCUMENTS

| | | |
|---|---|---|
| EP | 1 047 241 A2 | 10/2000 |
| EP | 1 056 256 A2 | 11/2000 |
| WO | 01/30046 A2 | 4/2001 |
| WO | 01/47218 A1 | 6/2001 |
| WO | 01/52477 A2 | 7/2001 |

\* cited by examiner

DATA PROCESSING SYSTEM AND METHOD

FIELD OF THE INVENTION

The present invention relates to a data processing system and method and, more particularly, to a computer aided telephony system and method.

BACKGROUND OF THE INVENTION

Computer aided telephony systems are well known within the art. Such systems typically include a server which runs a voice application and a digital trunk processor to provide high quality computer aided telephony functions. The telephony functions include, for example, a digital trunk adapter and E1/T1 trunk interface card, DTMF detection or generation resources, text-to-speech resources, facsimile resources and voice recognition resources.

Typically a voice application running at the server, in response to an incoming call, requires access to a number of the above computer aided telephony resources. Normally access is provided to such call processing resources via a time division multiplexed (TDM) bus such as a SONET bus. However, it is sometimes the case that the server either does not provide call processing hardware resources such as voice processing digital signal processors and the like, or does not have access to a TDM bus such as hardware and software implementing such a SONET bus. In those circumstances, it is not possible to implement a computer aided telephony system effectively.

It is an object of the present invention at least to mitigate some of the problems of the prior art.

SUMMARY OF INVENTION

Accordingly, a first aspect of the present invention provides a TDM bus emulation method for processing data using first and second software data processing resources of a computer including a central processing unit and a memory; the method comprising the steps of:

establishing, within the memory, a data structure containing at least one chain of data identifying an order of execution of the first and second software data processing resources; the data structure providing access to corresponding data to be processed by at least one of the first and second software data processing resources;

executing, using the central processor and memory, one of the first or second software data processing resources for a first predetermined time period according to the data contained within the data structure to produce first data processing results from the corresponding data;

identifying from the data contained within the data structure the next software data processing resource of the first and second resources to be executed; and executing the identified software data processing resource for a second predetermined time period to process the first data processing results to produce second data processing results.

Advantageously, since the data structure determines the order of execution of the software DSP resources and each software DSP resource is granted access to the system resources periodically or at least for a short period of time at various intervals, the conventional telephony functions required by an application can be supported even in the absence of hardware DSPs or a physical TDM bus.

It will be appreciated that it is desirable to share access to any common system resources such as the central processor and memory etc. Therefore, a preferred embodiment provides a method further comprising the step of periodically generating an interrupt which determines the duration of at least one of the first and second predetermined time periods; and terminating a currently executing software data processing resource and commencing execution of a next identified software data processing resource.

The data to be processed by a software data processing resource will be stored within the system memory of a server. Suitably, an embodiment provides a method in which the data structure comprises for each entry at least one of an indication of an associated software data processing resource to be executed and an indication of the corresponding data to be processed by the associated software data processing resource.

Since the telephony or other functions required by an application may include a need for access to several distinct processing requirements, preferred embodiments provide a method in which a data structure is provided which comprises an indication of the next software data processing resource to which any data processing results produced by the associated software data processing resource should be directed. In this manner, the software processing resources can share or exchange data.

Preferred embodiments provide a method in which the step of establishing the data structure comprises receiving a request from an application for access to at least one of the first and second software data processing resources.

Embodiments of the present invention find application within computer aided telephony systems. Suitably, embodiments provide a method in which at least one of the first and second software data processing resources implements a telephony related function.

At initialisation, a computer aided telephony system may not have a clear indication of the data processing resources that are available to support an application. Accordingly, an embodiment provides a method further comprising the step of interrogating system resources of the computer to identify the presence of any software data processing resources; and assigning respective identifiers to any identified software data processing resources. Suitably, the DSP resources can be used readily by an application.

It will be appreciated that a conventional TDM bus provides access to any resident DSP resources on a TDMA basis. Therefore, embodiments provide a data processing method comprising the step of stepping through each entry in the data structure and executing an identified software data processing resource using corresponding data to produce first data; which first data forms the corresponding data for a subsequently identified software data processing resource identified within the data structure. By stepping through each entry in the data structure, each of the software data processing resources is granted access to the system resources of the computer system to allow each to perform their respective functions.

An aspect of the present invention provides a data processing method comprising the steps of executing a first software data processing resource, identified in an entry of a data structure, using corresponding data to produce first data; which first data forms the corresponding data for a second software data processing resource, subsequently identified within a further entry of the data structure; and executing the second software data processing resource to process the first data to produce second data.

A further aspect of the present invention provides a computer program element comprising computer program code for implementing a TDM bus emulation system or method.

A still further aspect of the present invention provides a computer program product comprising a computer readable storage medium having stored thereon the above described computer program element.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
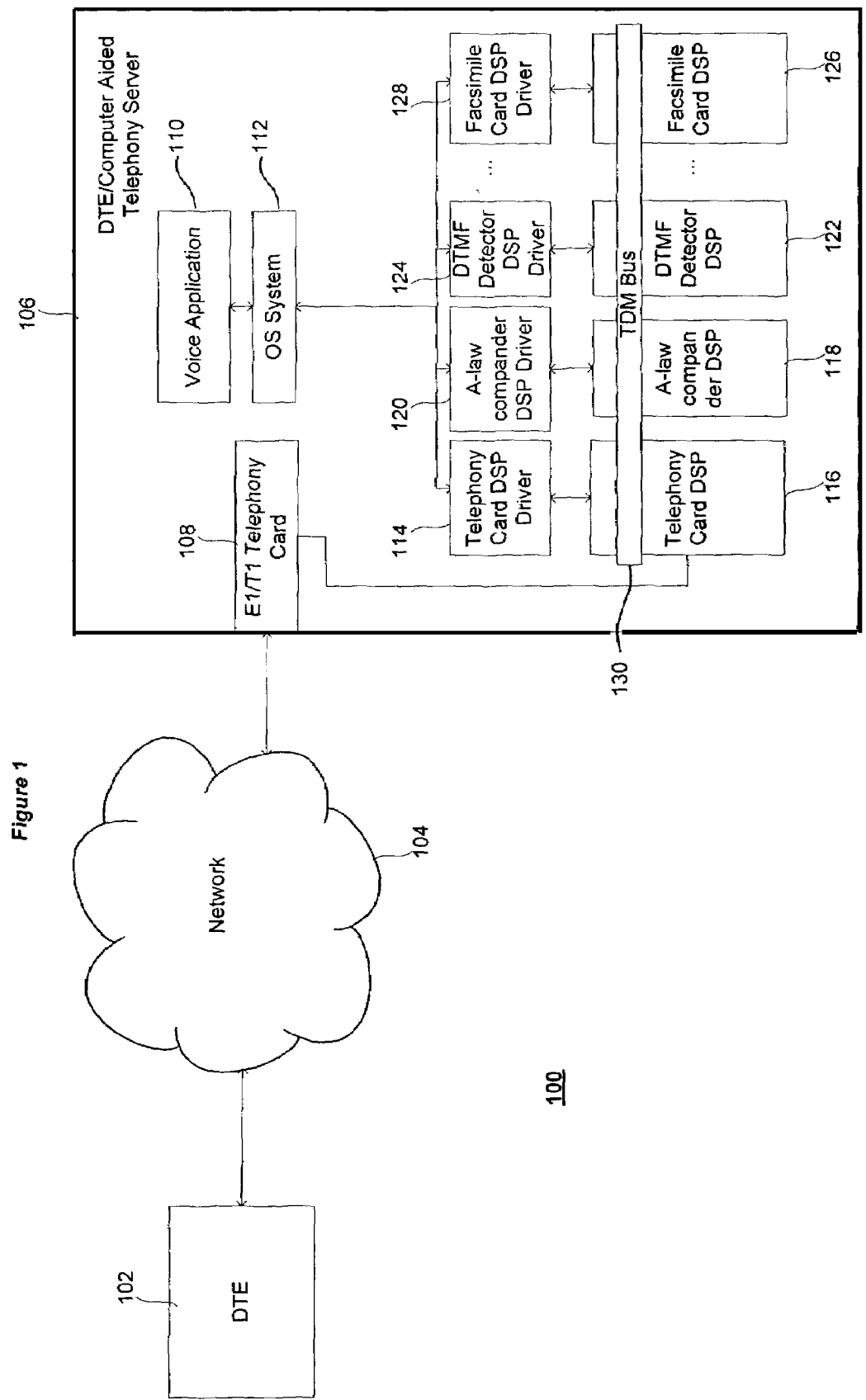
FIG. 1 shows a conventional computer aided telephony system in accordance with the prior art.

Referring to FIG. 1 there is shown a computer aided telephony system 100 comprising a data terminating equipment 102 such as, for example, a telephone or a computer. The data terminating equipment 102 is connected via a network 104 to a computer aided telephony server 106 using an E1/T1 telephony card 108. The computer aided telephony server provides a service to a customer using a combination of voice menus and speech recognition or telephone keypad keystrokes under the control of a voice application 110, which runs on top of an operating system 112.

The computer aided telephony server 106 has a number of hardware and software resources which the voice application 110 may use to service an incoming call or to establish an outgoing call. The hardware resources include an A-law or µ-law compander DSP 118 and associated software driver 120, a DTMF detector DSP 122 and associated driver 124 and a facsimile card DSP 126 and associated driver 128. Text-To-Speech and Automatic Speech Recognition DSPs and associated software drivers may also be provided (not shown).

A TDM bus 130, which operates on a time slot basis is provided to support the exchange of data between the hardware resources and the voice application. Each of the hardware DSPs can receive and output data via assigned time slots.

An incoming call is received from the data terminating equipment 102 via the E1/T1 telephony card 108 as is known with the art. The telephony card forwards an interrupt to a voice application 110 which, in response to receiving that interrupt, calls, via the operating system 112, a telephony card DSP driver 114 that controls a hardware telephony card DSP 116 for receiving the incoming data of the E1/T1 telephony card 108.

Having received raw telephony data from the network 104, the A-law or µ-law compander DSP 118 and driver 120 expand any telephony data received from the E1/T1 telephony card 108 and telephony card DSP 116 and associated driver 114. The A-law or µ-law DSP 118 and driver 120 output any data processing results for further processing by the voice application or another DSP via the time division multiplexed bus 130. Once the data has been decompanded it is in a form that is suitable for further processing.

The voice application 110 can then make use of the other resources to implement desired telephony functions as is well known within the art. The DTMF detector DSP 122 and driver 124 can be used by the voice application to receive inputs from a user (not shown) of the DTE 102. If the voice application 110 needs to provide a form of fax-on-demand function, the facsimile card DSP 126 and driver 128 will be used.

Figure 2:
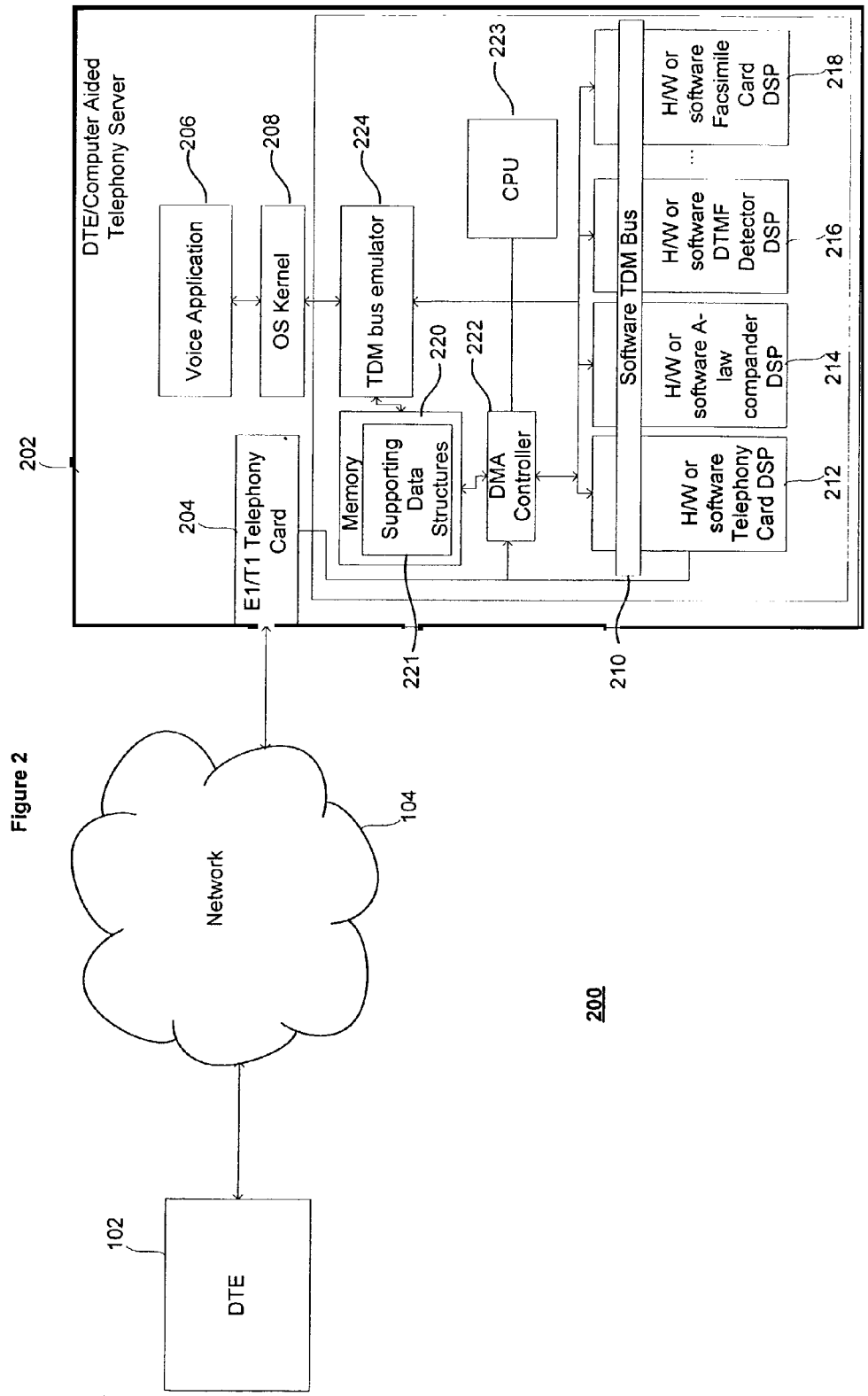
FIG. 2 shows a computer aided telephony system in accordance with an embodiment of the present invention.

Referring to FIG. 2 there is shown a computer aided telephony system 200 in accordance with an embodiment of the present invention. Again, there is provided a data terminating equipment 102 connected via the network 104 to a computer aided telephony server 202. The computer aided telephony server 202 comprises an E1/T1 telephony trunk card 204, a voice application 206 that runs on top of an operating system 208.

However, the computer aided telephony server 202 does not have, unlike known systems, a hardware TDM bus. Instead a TDM bus is emulated to provide a software TDM bus 210. The software TDM bus and its operation will be described in greater detail hereafter.

A number of digital signal processors which include, for example, a telephony card DSP 212, an A-law or µ-law compander DSP 214, a DTMF detector DSP 216 and a facsimile card DSP 218, should preferably be accessible using the software TDM bus 210. It will be appreciated that other DSPs can additionally be provided which perform speech recognition or synthesis functions. Each of the DSPs may be either a hardware resource or a software data processing resource that emulates a hardware DSP. In a preferred embodiment the software TDM bus 210 provides access to software resources that emulate hardware resources.

Embodiments of the present invention find particular application in implementing computer aided telephony systems using servers that do not have particular types of hardware. The particular types of hardware that are missing may include, in particular, a hardware TDM bus such as a SONET bus, or a hardware DSP resource.

A TDM bus emulator 224 is provided to emulate the operation of a conventional TDM bus, that is, the TDM bus emulator 224 implements the software TDM bus 210. The TDM bus emulator 224 supports access to the data processing DSPs 212 to 218 by the voice application 206.

The interface between the voice application 206 and the OS 208 in the present example is substantially the same as that between the voice application and the operating system of known servers. It can be appreciated that maintaining this degree of interoperability ensures compatibility with current voice applications. In essence, the voice application will be presented with a consistent application interface to obtain support for telephony functions regardless of whether those telephony functions interact using a SONET TDM bus or a software TDM bus and software DSPs.

The TDM bus emulator 224 receives requests for access to the data processing resources and ensures that those requests are serviced so that the voice application 206 can perform its intended function. The TDM bus emulator 224 constructs sophisticated data structures to ensure that each of the data processing DSPs 212 to 218 can interact and can be accessed by the voice application 206 to perform their intended functions. The data structures are used to control the order of processing of the software DSP resources.

Figure 3:
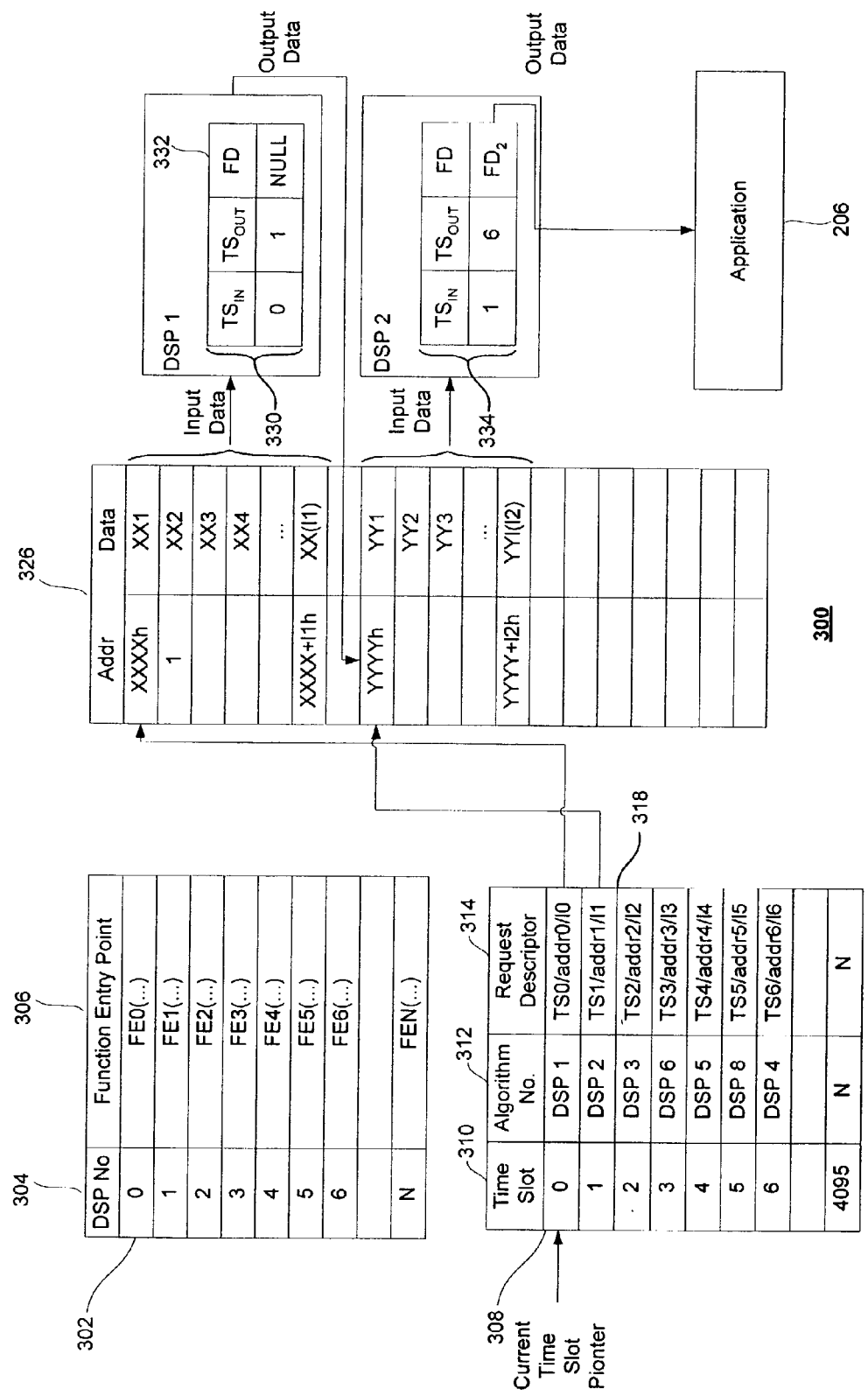
FIG. 3 shows a number of data structures used in an embodiment of the present invention.

Referring to FIG. 3 there is shown an embodiment of the sophisticated data structures 300 used by the TDM bus emulator 224 in supporting the voice application 206. The data structures 300 include a DSP and function entry point table 302 which stores an identifier for each DSP, in a first field 304, and a function entry point for each of the DSPs, in a second field 306. A function entry point identifies or defines a format of the function that is used to call one of the data processing DSPs 212 to 218.

A time slot table 308 stored within the memory 220 is used by the TDM bus emulator 224 to allocate time slots to each of the DSPs identified in the first table 302. The TDM bus emulator 224 provides, in accordance with the order established in the second table 308, access to a central processor 223 or hardware resources when implementing a required telephony processing function. The central processor and other hardware resources of the server 202 are used to execute the code corresponding to the software DSPs, the application, operating system and TDM bus emulator.

The time slot table 308 comprises three columns; namely a time slot number column 310, an algorithm or DSP column 312 and a request descriptor column 314.

The time slot number column 310 contains a list of the software TDM bus time slots. The time slots that are currently in use have associated data contained within the remaining columns. In the present example, time slots 0 to 4095 are notionally available for use by the data processing resources 212 to 218.

The algorithm or DSP number column 312 comprises a DSP identifier, that is, a DSP number taken from the DSP number column 304 of the first table 302. That DSP number identifies the DSP that will be operable within the corresponding time slot. For example, it can be seen that the second DSP, having an identifier of 1 and a function entry point FE1( . . . ), is allowed to operate within the time slot having the number 0.

The request descriptor column 314 contains an indication of the current time slot, a start address of a data buffer within the memory 220 at which the current DSP can access data to be processed and an indication of the length of the data buffer. In the illustrated example a current time slot pointer is pointing to time slot number 0. DSP number 1, having function entry point FE1( . . . ), is operable within time slot 0. DSP 1 will process the data that is stored within the memory at addresses XXXXh to (XXXX+11)h. The results of the data processing performed by DSP 1 are stored in a buffer beginning at address YYYYh. The DSP that is operable within the successive time slot is DSP number 2. When the current time slot pointer is incremented, in response to the TDM bus emulator having received an interrupt, DSP 2 is arranged to process the output data placed in the buffer at addresses YYYYh to (YYYY+12)h by the previous DSP, that is, DSP 1.

It can be appreciated from the above that a chain of DSPs is established and that data processed by the DSPs in that chain is passed along the chain. In essence the processing is performed in a sequence that is controlled by the position of a DSP's identifier within the time slot table.

The TDM bus emulator 224 increments the current time slot pointer every time an interrupt is received. In this manner, the TDM bus emulator steps through each of the occupied time slots and allocates processing time or resources to each of the software DSPs in turn. In a preferred embodiment, the interrupt is generated every 8 msec by the E1/T1 telephony card.

It will be appreciated by those skilled in the art that the conventional internal bus of the computer aided telephony server 202 will be used, in the event of there being a hardware DSP resource, to direct data to that hardware resource. Furthermore, it will be appreciated that, in the event of a software DSP being implemented or a software TDM bus being implemented, the conventional computing resources, such as the usual address and data buses, the central processor and on-board memory, will be made available in a multi-tasking or multi-threaded manner to allow the software DSP to execute and to provide additional telephony functionality without having to incur the overhead or inconvenience of installing further DSP hardware resources. An instance of a software DSP will be instantiated and the associated data processed using the thread or multi-tasking capability of the server.

Each DSP 212 to 218 contains a data structure which identifies the time slots on which data can be received from another DSP and on which data can be output to another DSP or returned to the application 206. The data structure also preferably contains a file descriptor column to contain a file descriptor that is used to return processing results to the application. It can be seen from FIG. 3 that DSP 1 328 has within its data structure 330 both an in time slot, $TS_{IN}$, and an out time slot, $TS_{OUT}$. The variable $TS_{IN}$ and $TS_{OUT}$ represent or contain a time slot number of the 0 to 4095 time slots for use by the DSPs. The data structure also contains a NULL entry in the file descriptor column 332, which indicates that there is no file descriptor that can be used to return the processing results to the application. Similarly, the data structure 334 corresponding to figure DSP 2 contain the values 1 and 6 in the time slot IN and OUT columns, indicating that DSP 2 will receive data on time slot 1 and output data processing results on time slot 6. The file descriptor entry for DSP 2 contains a file descriptor, $FD_2$, which is used to return the data produced by DSP 2 to the application 206 during time slot 6.

At initialisation the TDM bus emulator 224 polls the hardware resources, if any, to determine their presence and to determine the processing capabilities of the server. Any located software data processing resources are loaded. The TDM bus emulator 224 assigns each of the identified processing resources a corresponding DSP number. The function entry point for each DSP is stored within the first table 302 adjacent to the assigned DSP number. The TDM bus emulator 224 can determine in advance the appropriate order of execution of each of the DSP resources and assign time slots accordingly. Alternatively, the time slots can be assigned dynamically in response to DSP processing resource calls issued by the voice application 206. In effect, for each new DSP call, the TDM bus emulator assigns appropriate IN and OUT time slots within the data structure for use by the DSP. When the time slot pointer is suitably incremented, the newly assigned time slots will be made available for use by the newly called DSP.

Embodiments that use a combination of hardware DSPs and software DSPs can be accommodated within the present invention seamlessly since, rather than the function entry point of a software DSP being stored, a call to the software driver associated with a hardware DSP is stored.

At initialisation or upon receipt of an incoming call, the current time slot pointer is set to the first time slot that contains the first DSP that is required to process the incoming call. In the example, the first DSP is a telephony card DSP 212.

The processing of data by the DSPs is performed until the processing results are returned to the application. A file descriptor within the FD column of the data structure contained within a DSP is used to indicate that the processing by the preceding sequence of DSPs or chained list of DSPs is complete and that the processing results should be returned using that file descriptor.

If more than one telephony application is launched or executed at the computer aided telephony server 202, the applications can share a common TDM bus emulator and have the processing resources divided accordingly. The DSP resources of each application will be allocated time slots within the time slot table 308 dynamically. Furthermore, the computer aided telephony server 202 may generally support a number of incoming and outgoing calls simultaneously. Each call can be referred to as a circuit. The processing resources required by each circuit are identified and included in the time slot map or table 308.

The present invention advantageously allows a telephony application, which would normally require a SONET bus, to be supported even in the absence of such a bus. This has the additional significant advantage that the voice application can be designed and written without regard for whether the underlying or supporting TDM technology is implemented in hardware, software or a combination of both.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A TDM bus emulation method for processing data using first and second software data processing resources of a computer, including a central processing unit and a memory; the method comprising the steps of:

establishing, within the memory, a data structure containing at least one chain of data identifying an order of execution of the first and second software data processing resources;

the data structure providing access to corresponding data to be processed by at least one of the first and second software data processing resources;

executing, using the central processor and memory, one of the first or second software data processing resources for a first predetermined time period according to the data contained within the data structure to produce first data processing results from the corresponding data;

identifying, from the data contained within the data structure, the next software data processing resource of the first and second resources to be executed; and executing the identified software data processing resource for a second predetermined time period to process the first data processing results to produce second data processing results.

2. A method as claimed in claim 1, further comprising the steps of periodically generating an interrupt which determines the duration of at least one of the first and second predetermined time periods.

3. A method as claimed in claim 1, in which the data structure comprises, for each entry, at least one of an indication of an associated software data processing resource to be executed and an indication of the corresponding data to be processed by the associated software data processing resource.

4. A method as claimed in claim 3, in which the data structure further comprises an indication of the next software data processing resource to which any data processing results produced by the associated software data processing resource should be directed.

5. A method as claimed in claim 1, in which the step of establishing the data structure comprises receiving a request from an application for access to at least one of the first and second software data processing resources.

6. A method as claimed in claim 1, in which at least one of the first and second software data processing resources implements a telephony function.

7. A method as claimed in claim 1, further comprising the steps of interrogating system resources of the computer to identify the presence of any software data processing resources; and assigning an identifier to any identified software data processing resources.

8. Apparatus for emulating a TDM bus to enable the processing of data using first and second software data processing resources of a computer, comprising:

means for establishing a data structure containing at least one chain of data identifying an order of execution of the first and second software data processing resources, the data structure providing access to corresponding data to be processed by at least one of the first and second software data processing resources;

a processor for executing one of the first or second software data processing resources for a first predetermined time period according to the data contained within the data structure to produce first data processing results from the corresponding data;

means for identifying, from the data contained within the data structure, the next software data processing resource of the first and second resources to be executed; and wherein the processor is further adapted for executing the identified software data processing resource for a second predetermined time period to process the first data processing results to produce second data processing results.

9. Apparatus as claimed in claim 8, further comprising: interrupt generation means for periodically generating an interrupt which determines the duration of at least one of the first and second predetermined time periods.

10. Apparatus as claimed in claim 8, in which the data structure comprises, for each entry, at least one of an indication of an associated software data processing resource to be executed and an indication of the corresponding data to be processed by the associated software data processing resource.

11. Apparatus as claimed in claim 10, in which the data structure further comprises an indication of the next software data processing resource to which any data processing results produced by the associated software data processing resource should be directed.

12. Apparatus as claimed in claim 8, in which the means for establishing the data structure is adapted to receive a request from an application for access to at least one of the first and second software data processing resources.

13. Apparatus as claimed in claim 8, in which at least one of the first and second software data processing resources implements a telephony function.

14. Apparatus as claimed in claim 8, further comprising:

means for interrogating the system resources of the computer to identify the presence of any software data processing resources; and wherein the means for establishing is adapted for assigning an identifier to any identified software data processing resources.

\* \* \* \* \*